J. GERARD.
MECHANICAL MOVEMENT.
APPLICATION FILED MAY 11, 1917.
1,286,281.
Patented Dec. 3, 1918.
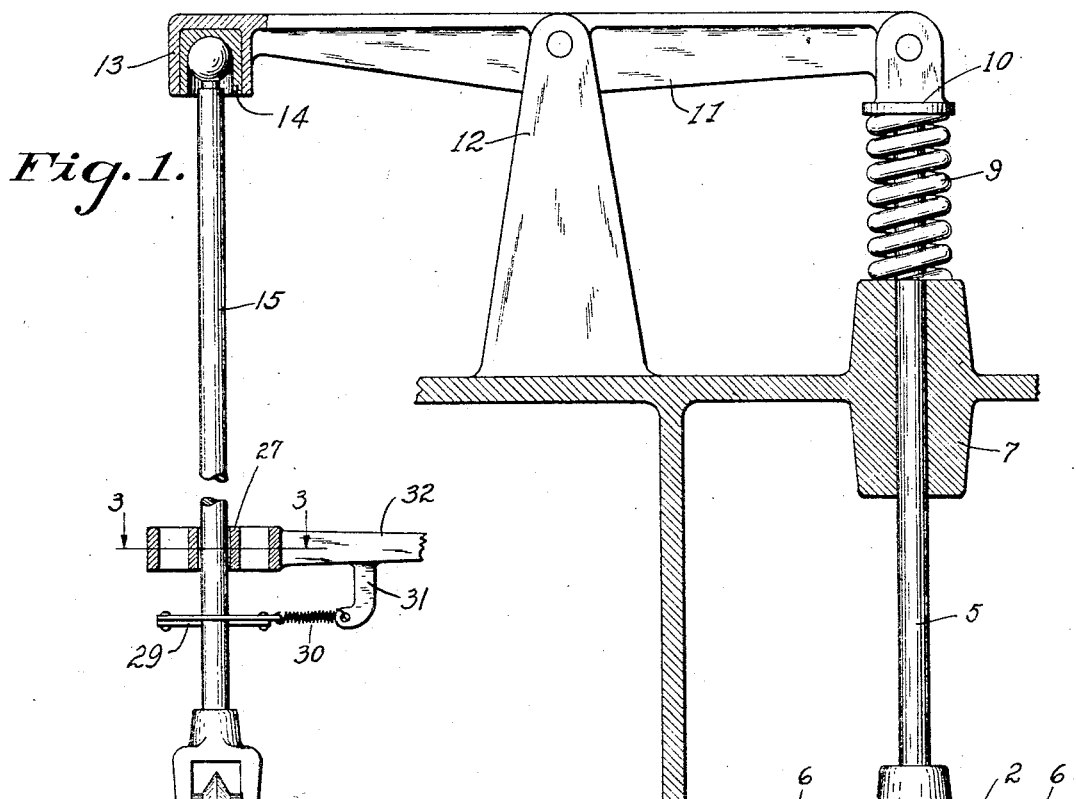
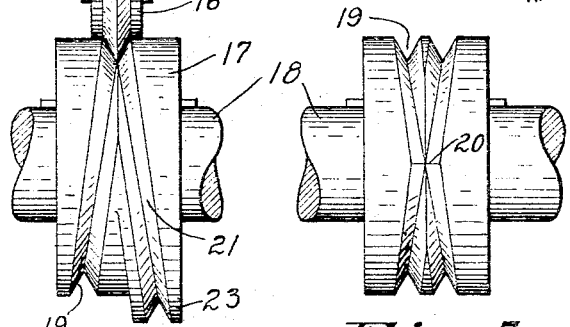
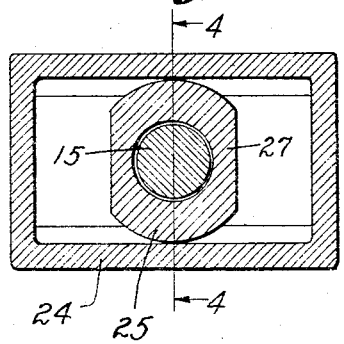
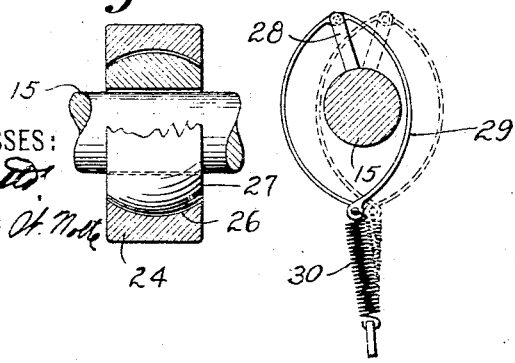
WITNESSES:
INVENTOR
Jules Gerard
BY
Emory Wheeler
ATTORNEYS

UNITED STATES PATENT OFFICE.

JULES GERARD, OF GREEN BAY, WISCONSIN, ASSIGNOR TO CRANK SHAFT VALVE MOVEMENT COMPANY, OF GREEN BAY, WISCONSIN, A CORPORATION OF WISCONSIN.

MECHANICAL MOVEMENT.

1,286,281.　　　　　　Specification of Letters Patent.　　Patented Dec. 3, 1918.

Continuation of applications Serial No. 88,454, filed April 3, 1916, and Serial No. 118,099, filed September 1, 1916. This application filed May 11, 1917. Serial No. 167,884.

*To all whom it may concern:*

Be it known that I, JULES GERARD, a citizen of the United States, residing at Green Bay, county of Brown, and State of Wisconsin, have invented new and useful Improvements in Mechanical Movements, of which the following is a specification.

My invention relates to new and useful improvements in mechanical movements, the present application being a continuation of an application filed by me April 3rd, 1916, Serial No. 88454, allowed January 16, 1917, as to the subject matter of claims 10 to 18 inclusive in this application, and also a continuation of an application filed by me September 1, 1916, Serial No. 118,099, allowed November 11, 1916, as to the subject matter of claims 1 to 9 inclusive in this application.

The principal object of my invention is to provide a mechanical movement for transforming rotary movement into intermittent reciprocatory movement at stated intervals. My invention is peculiarly adapted for use in connection with the valve mechanism of internal combustion engines, as I am thereby enabled to obviate the necessity of providing an independent valve operating shaft driven by reducing gears from the crank shaft of the engine.

My invention contemplates the provision of a rotary cam having a set of peripheral grooves therein, said grooves, or portions thereof, having a relative inclination in planes obliquely transverse to the cam shaft, and having a meeting point common to the bases of both grooves, whereby a roller adapted to travel in the grooves may have a cross-over point and may be caused to pass from one groove to the other. It is a further object of my invention to provide an improved means for guiding the roller to insure its alternate engagement with the grooves.

A still further object is to provide the roller with side bearings adapted to travel along the surface of the cam adjacent to the grooves and relieve the pressure of the roller at the bases of the grooves, and to facilitate guiding the roller from one groove into the other, and reduce frictional wearing contacts to a minimum.

With the above and other objects and advantages in view, my invention resides more particularly in the novel combination, formation and arrangement of parts hereinafter described and more particularly pointed out in the accompanying claims.

In the drawings:

Figure 1 is a general view of a valve mechanism embodying my invention, and showing the grooved cam collar with the meeting point of its grooves arranged at its junction with the roller.

Fig. 2 is a plan view of the collar with the meeting point of its grooves disposed uppermost.

Fig. 3 is a detail sectional view on line 3—3 of Fig. 1 through the guide box for the roller carrying rod.

Fig. 4 is a transverse sectional view through said box on line 4—4 of Fig. 1, and Fig. 5 is a detail sectional view of a spring means for positively guiding the roller in its rocking movements to alternately engage the grooves.

In Fig. 1 I have illustrated a fragment of the cylinder 1 of an internal combustion engine to which my improved valve mechanism is applied. The valve 2 may be regarded either as an inlet or as an exhaust valve, similar mechanism being preferably used in any case where a cam actuated valve is to be employed. The valve stem 5 is slidably mounted in a suitable guide bearing 7, the valve being urged to its seat 6 by a compression spring 9 interposed between the bearing 7 and a collar 10 on the outer end of the stem. Said outer end of the stem is pivoted to one end of a lever 11 which is in turn pivoted to a suitable support 12. The other end of the lever 11 is provided with a cup shaped enlargement 13 open at its bottom and having fitted therein a socket block 14 for the spherical head of a vertically disposed rod 15, the lower end of which is bifurcated to receive a roller 16 engageable with a cam wheel 17 on a shaft 18 which is preferably the main crank shaft of the engine, the roller being resiliently urged for engagement with the wheel 17 by the valve closing spring 9.

The cam wheel 17 is provided with a peripheral groove 19, disposed in a plane oblique to the axis of the shaft whereby to form helical portions extending from a switching point 20 and meeting at the opposite side of the wheel in longitudinally spaced relation to the switching point. The cam wheel is also provided with a second groove 21 having its base disposed in a plane oblique to the axis of the shaft to thus provide helical portions extending from the switching point 20 at an opposite inclination with respect to the helical portions of the groove 19. The roller 16 is provided with an annular V-shaped rib 22 centrally disposed on its periphery, and the walls of the grooves 19 and 21 are preferably so formed that the sides of the rib 22 will substantially fit the grooves. This relation makes it desirable that the walls as shown be varied in inclination in proportion to the angular pitch assumed by the roller carrying rod 15 in swinging laterally toward one side or the other as the roller travels in one or the other of the cam grooves. The groove 21 has a portion 23 eccentrically disposed with relation to the groove 19 and the shaft, the apex of this portion 23 being located approximately 90 degrees from the switching point 20. Thus when the roller 16 reaches this so-called "high point" or cam projection a longitudinal movement will be imparted to the rod 15, and this movement will be transmitted through the lever 11 to open the valve 2 against the tension of the compression spring 9.

The cylindrical end portions of the roller 16 form horizontal bearing faces adapted to bear upon the peripheral surface of the collar 17 and its cam enlargement 23, and thus to a considerable extent relieve wear of the rib 22 and the surfaces of the grooves, and facilitate controlling the oscillatory movement of the roller about the axis of rod 15.

The normal tendency of the roller at the switching point 20 is to cross over into the other groove, and this tendency is due to the inclination of the roller in the helically grooved portion. By the provision of the cylindrical end bearing surface portions of the roller, this action is rendered still more positive in view of the fact that, with the roller at the switching point, the frictional contact of the horizontal bearing surface at that side of the switching point adjacent the previously traveled groove diminishes, and the frictional contact of the other cylindrical end bearing surface increases upon continued movement of the roller, to thus hold the roller in its initial tendency of movement by providing greater friction at one side of the axis of its carrying rod 15.

Thus, with the rod 15 suitably held against movement transversely of the shaft 18, yet in such a manner as to permit a sliding and rotative movement and a laterally oscillating movement longitudinally of the shaft, the roller 16 of the rod will alternately traverse the grooves 19 and 21, to procure a reciprocative movement of the rod 15 and open and close valve 2 upon every second rotation of the shaft 18 when the roller traverses groove 21.

To hold the rod 15 for proper movements, a suitably supported guide frame 24 is provided, which is elongated longitudinally of the shaft 18 and slidably mounted in this frame by the engagement of its spherical end sections 25 in transversely arcuate channels 26 in the sides of the frame is a bearing block 27 through which the rod 15 is slidably passed. Thus said bearing block may slide longitudinally in the frame 24 and may also rock therein.

Under some conditions, and particularly when operating at a very high speed, it is desirable to provide an aditional means for insuring proper rocking movement of the roller 16 at the switch point 20, to procure its proper alternate engagement with the grooves. As shown more particularly in Fig. 5, I have provided a positive guiding means which comprises an arm 28 secured to, and projecting laterally from, the rod 15 in a direction parallel to the axis of the roller 16, and secured to this arm is one end of a yoke loop 29 which embraces the rod and which has its other end secured to a retractile spring 30. This spring is secured to a finger 31 preferably carried by a supporting arm 32 of the guide frame 24, and the finger 31 is disposed substantially in a vertical plane passing through the axis of the shaft 18. Thus upon a twisting movement of the roller 16 to conform to the contours of the grooves 19 and 21 the arm 28 will be swung across a dead center line passing through the axis of the rod 15 and the attaching portion of the spring, and as the roller approaches the crossing point 20, it is in each instance resiliently held for continued movement in the same direction to effect its alternate switching from one groove to another.

I claim:

1. The combination with a rotary cam having a plurality of grooves which converge on one side to a common meeting point, one of said grooves being formed to extend over a cam portion carried by the cam, whereby a portion of said groove is eccentric to the axis of the cam, of a roller adapted to travel in said grooves and to cross over from one to the other at said common meeting point, means for resiliently holding said roller in engagement with said grooves, and means integral with said roller for guiding the same throughout its travel in the respective grooves.

2. The combination with a rotary cam having a plurality of grooves which converge on one side to a cross-over point, of a roller adapted to travel in said grooves and to cross from one to the other at said cross-over point, means for resiliently holding said roller in engagement with said grooves, and means integral with said roller for guiding the same throughout its travel in the respective grooves.

3. The combination with a cam shaft, of a cam mounted to rotate therewith and provided with a plurality of peripheral grooves which converge on one side of the cam to a common meeting point at the base of the respective grooves, one of said grooves being eccentric to the axis of the cam, and the other of said grooves being concentric therewith, a rod, a guide for said rod permitting axial and lateral reciprocation of said rod, a roller carried by said rod in engagement with said grooves, means for resiliently pressing the rod and the roller in a direction toward said cam, and means integral with said roller for guiding the same throughout its travel in the respective grooves.

4. The combination with a cam shaft, of a cam mounted to rotate therewith and provided with a plurality of peripheral grooves which converge on one side of the cam to a common meeting point at the base of the respective grooves, one of said grooves being eccentric to the axis of the cam and the other of said grooves being concentric therewith, a rod, a guide for said rod permitting axial and lateral reciprocation of said rod, a roller carried by said rod in engagement with said grooves, a lever having universal connection with the other end of said rod, resilient means acting on said lever whereby the rod and the roller are pressed toward said cam, and means integral with said roller for guiding the same throughout its travel in the respective grooves.

5. The combination with a cam shaft, of a cam mounted to rotate therewith and provided with a plurality of peripheral grooves separated from each other on one side of the cam and converging on the other side to a common meeting point at the base of the respective grooves, one of said grooves being eccentric to the axis of the cam, and the other of said grooves being concentric therewith, a rod, a guide for said rod permitting axial and lateral reciprocation of the same, a roller carried by said rod and being provided with guiding means to insure its alternate travel in the respective grooves, and means for resiliently pressing said rod and said roller toward said cam, said grooves having converging side walls and said roller having a correspondingly beveled periphery, substantially as described.

6. The combination with a rotary cam having a plurality of grooves which converge on one side to a common cross-over point at the base of the respective grooves, of a roller adapted to travel in said grooves and to cross from one to the other at said cross-over point, and means for resiliently holding said roller in engagement with said grooves, said grooves having converging side walls and said roller having correspondingly beveled peripheral surfaces merging at their bases into horizontal annular bearing surfaces.

7. The combination with a cam shaft, of a cam mounted to rotate therewith and provided with a plurality of peripheral grooves separated from each other on one side of the cam and converging on the other side to a common meeting point at the base of the respective grooves, one of said grooves being eccentric to the axis of the cam, and the other of said grooves being concentric therewith, a rod, a guide for said rod permitting axial and lateral reciprocation of the same, a roller carried by said rod in engagement with the respective grooves, and means for resiliently pressing said rod and said roller toward said cam, said grooves having converging side walls and said roller having correspondingly beveled peripheral surfaces merging at the base into horizontal annular bearing surfaces.

8. The combination with a rotatable cam having peripheral grooves which converge to a cross-over point, of a roller supporting member, a roller carried by said member provided with an annular rib engageable in the grooves, said roller also having an annular bearing surface engageable with the periphery of the cam, and means for holding the roller against the cam.

9. The combination with a rotatable cam having peripheral grooves which converge to a cross-over point, of a roller supporting member, a roller carried by said member provided with an annular rib engageable in the grooves, said roller also having annular guiding and bearing surfaces at both sides of its annular rib adapted to engage the periphery of the cam.

10. The combination with a rotatable cam having peripheral grooves which converge to a cross-over point, of a roller adapted to travel in said grooves and to cross from one to the other at said cross-over point, a carrying member for said roller mounted for rotation on an axis traversing the cam, and means independent of the roller and grooves normally urging rotation of said carrying member on its axis.

11. The combination with a rotatable cam having peripheral grooves, including pairs of helical portions diverging from a common cross-over point, of a roller adapted to travel in said grooves and to cross from one to the other at said cross-over point, a carrying member from said roller mounted for rotation on an axis traversing the cam and means connected with the carrying member and independent of the roller and grooves for procuring crossing movement of the roller at said cross-over point.

12. The combination with a rotatable cam having peripheral grooves, which converge to a cross-over point, of a roller adapted to travel in said grooves and to cross from one to the other at said cross-over point, a carrying member for said roller mounted for rotation on an axis traversing the cam, and resilient means urging rotation of said carrying member selectively in either direction upon approaching said cross-over point.

13. The combination with a rotatable cam having peripheral grooves, which converge to a cross-over point, of a roller adapted to travel in said grooves and to cross from one to the other at said cross-over point, a carrying member for said roller mounted for rotation on an axis traversing the cam, an arm extending from one side of the carrying member in the direction of the axis of the cam, a spring at the other side of the carrying member, and a connection between said arm and spring permitting movement of the arm to both sides of the axis of the cam.

14. The combination with a rotatable cam having peripheral grooves which converge to a cross-over point, of a roller adapted to travel in said grooves and to cross from one to the other at said cross-over point, a carrying member for said roller mounted for rotation on an axis traversing the cam, an arm extending from one side of the carrying member in the direction of the axis of the cam, a spring at the other side of the carrying member, and a yoke loop surrounding the carrying member and connected with the arm and spring.

15. The combination with a cam having peripheral grooves which converge on one side to a cross-over point, and a roller adapted to travel in said grooves and to cross from one to the other at said cross-over point, of a roller supporting rod, a spring arranged to draw upon said rod at a point distant from its axis and in a plane transverse to the cam axis and which approximately cuts said cross-over point, and a guide for said rod adapted to permit the latter to oscillate rotatively, whereby the roller is permitted to conform to the converging and diverging portions of the grooves, and the rod is prevented from oscillating out of such conforming position, substantially as described.

16. The combination with a rotary cam having a plurality of peripheral grooves converging on one side to a cross-over point common to the bases of both grooves, one of said grooves being formed to extend over a cam projection carried by the cam, whereby said groove is eccentric to the axis of the cam in the portion occupied by said projection, a roller adapted to travel in said cam grooves and to cross over from one to the other at said common meeting point, once during each revolution of the cam, a rod provided with a roller supporting member in which said roller is journaled, a lever having universally jointed connection with the other end of said rod, and a guide for said rod adapted to permit both longitudinal and rotative oscillations, together with a supporting frame for said guide adapted to permit lateral sliding movements in two directions, whereby the roller may swing from side to side as it travels along the diverging and converging portions of the respective grooves.

17. The combination with a rotary cam having a plurality of peripheral grooves converging on one side to a cross-over point common to the bases of both grooves, one of said grooves being formed to extend over a cam projection carried by the cam, whereby said groove is eccentric to the axis of the cam in the portion occupied by said projection, a roller adapted to travel in said cam grooves and to cross over from one to the other at said common meeting point, once during each revolution of the cam, a rod provided with a roller supporting member in which said roller is journaled, a lever having universally jointed connection with the other end of said rod, and a guide block for said rod adapted to permit both longitudinal and rotative oscillations, said block having end portions of spherical section and a supporting frame having longitudinal transversely arcuate channels holding said spherical base sections, whereby the roller may swing from side to side as it travels along the diverging and converging portions of the respective grooves.

18. The combination with a rotary cam having a plurality of peripheral grooves converging on one side to a cross-over point common to the bases of both grooves, one of said grooves being formed to extend over a cam projection carried by the cam, whereby said groove is eccentric to the axis of the cam in the portion occupied by said projection, a roller adapted to travel in said cam grooves and to cross over from one to the other at said common meeting point, once during each revolution of the cam, a rod provided with a roller supporting member in which said roller is journaled, a lever having universally jointed connection with the other end of said rod, and a guide for said rod adapted to permit both longitudinal and rotative oscillations of said rod, together with a valve operatively connected with said lever, and a spring adapted to normally hold said valve to its seat and also adapted to actuate said lever and rod in a direction to press the roller resiliently into the engaged groove on said cam.

In testimony whereof I affix my signature in the presence of two witnesses.

JULES GERARD.

Witnesses:
A. S. CANNARD,
F. S. HATLETT.